March 5, 1968  T. HUTSON, JR  3,372,207
ALKYLATION PROCESS
Filed July 10, 1964
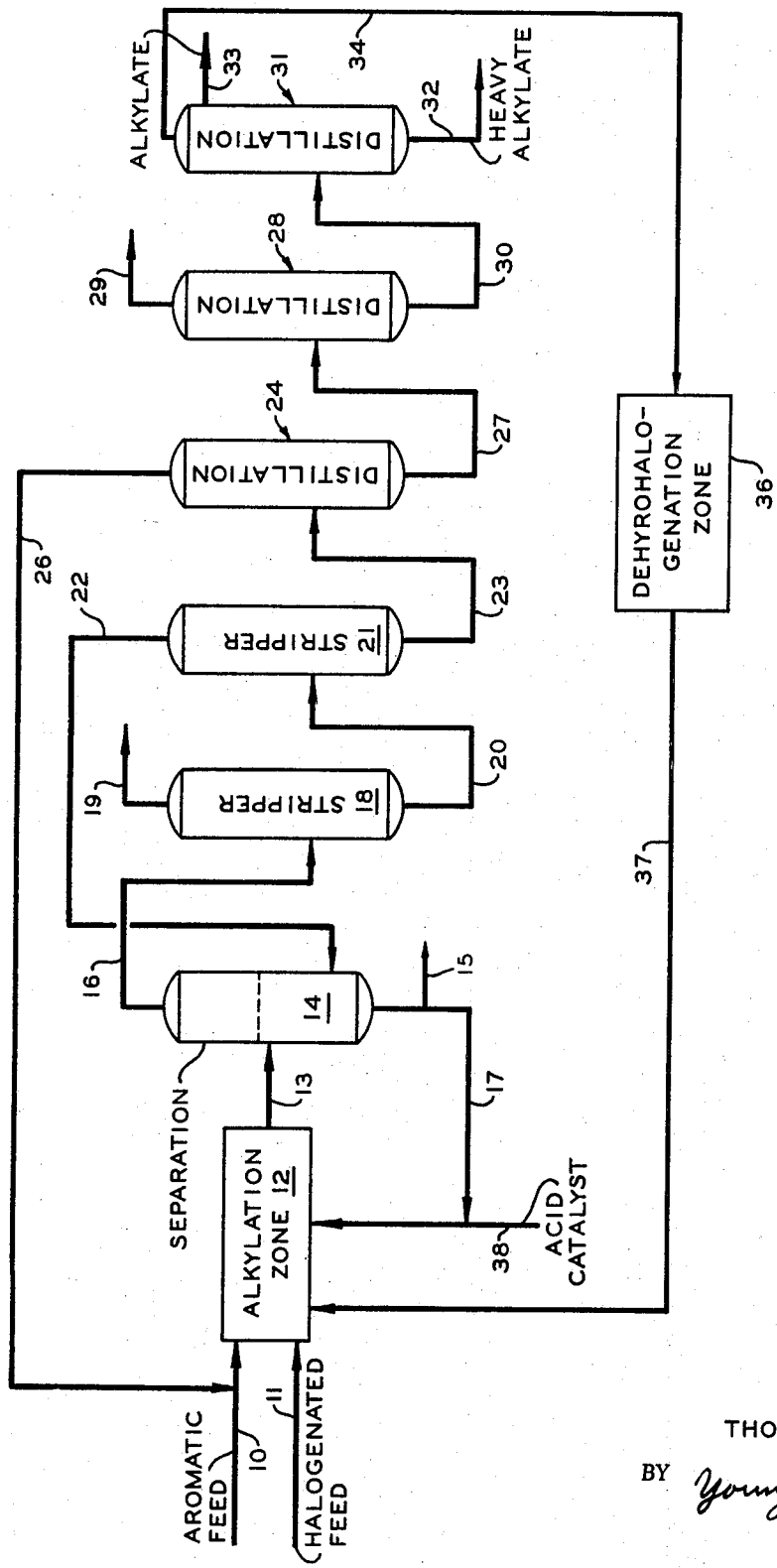
INVENTOR.
THOMAS HUTSON, JR.
BY *Young & Quigg*
ATTORNEYS 3,372,207
ALKYLATION PROCESS
Thomas Hutson, Jr., Bartlesville, Okla., assignor to Phillips
Petroleum Company, a corporation of Delaware
Filed July 10, 1964, Ser. No. 381,773
6 Claims. (Cl. 260—671)

ABSTRACT OF THE DISCLOSURE

Paraffins are halogenated to a mixture of primary and secondary monohaloalkanes. This mixture is passed to an alkylation zone where an aromatic hydrocarbon is alkylated using a catalyst such as HF. The effluent comprising unreacted primary monohaloalkanes, catalyst, and alkylate product is withdrawn from said alkylation zone and passed to a separation system wherein the catalyst is separated from the hydrocarbon; said unreacted primary monohaloalkanes are separated from the alkylate product and passed through a dehydrohalogenation zone wherein they are converted to 1-olefins. The 1-olefin effluent from this dehydrohalogenation zone is recycled to said alkylation zone wherein said 1-olefins are reacted with the aromatic hydrocarbon to produce additional alkylate.

---

This invention relates to an improved alkylation process. In another aspect, this invention relates to the production of alkylates from aromatic compounds and monohaloalkanes. In yet another aspect, this invention relates to an alkylation process wherein high molecular weight detergent alkylates are produced from aromatic hydrocarbons, monohaloalkanes and linear 1-olefins.

It is known in the art that aromatic hydrocarbons such as benzene, toluene, naphthalene, and the like, can be reacted in the presence of an acid catalyst with an alkyl halide to produce the corresponding alkylated aromatic hydrocarbons. The alkyl halides can be conventionally produced by the halogenation of normal paraffins to produce monohaloalkanes in high yield. For example, normal paraffin mixture, e.g., a mixture containing decane, undecane, dodecane and tridecane, can be chlorinated photochemically to produce monoalkyl chlorides in high yield. These chlorides contain normally about 10 percent primary isomers, the remainder being secondary isomers. When the mixture of these produced alkyl chlorides is reacted with an aromatic compound in an alkylation zone, the secondary alkyl chlorides react with the aromatic compound, but the primary alkyl chlorides do not react to any appreciable extent.

Accordingly, an object of my invention is to provide an improved alkylation process.

Another object of my invention is to provide for the production of an alkylate from an aromatic compound and a mixture of primary and secondary monohaloalkanes.

Another object of my invention is to provide an alkylation process wherein the hydrocarbon feed to said alkylation process comprises an aromatic hydrocarbon, a mixture of primary and secondary monohaloalkanes and a 1-olefin.

Another object of my invention is to provide an alkylation process for the production of detergent alkylates.

Other objects, advantages and features of my invention will be readily apparent to those skilled in the art from the following description, the drawing and appended claims.

Broadly, by my invention I have provided a process for the production of an alkylate from an aromatic hydrocarbon and a mixture of primary and secondary monohaloalkanes wherein the secondary monohaloalkanes are reacted with the aromatic hydrocarbon in an alkylation zone and the primary monohaloalkanes are separated from the alkylation zone hydrocarbon effluent; the separated primary monohaloalkanes are dehydrohalogenated to produce 1-olefins; and the 1-olefins are recycled to the alkylation zone wherein the 1-olefins are reacted with the aromatic hydrocarbon.

By my invention, I have provided a process wherein the primary monohaloalkanes contained in the halogenated feed passed to the alkylation zone are effectively employed to produce additional alkylate, thereby substantially increasing the effectiveness of the alkylation process to utilize a mixed halogenated feed containing both primary and secondary monohaloalkanes.

The monohaloalkanes employed in the alkylation process of my invention are the monochloroalkanes and monobromoalkanes containing from 3 to about 20 or more carbon atoms per molecule. Although there is no upper limit on the number of carbon atoms in said monohaloalkanes, the monohaloalkanes containing more than 20 carbon atoms per molecule are not normally utilized due to their higher boiling points. When employed to produce a detergent grade alkylate, the monohaloalkanes will preferably be straight chain and will contain a more restricted range of carbon atoms per molecule, e.g., 10 to 15, depending upon the properties desired in the detergent. Examples of monohaloalkanes which can be utilized in the practice of my invention include, among others, the following: propyl chloride, pentyl chloride, octyl bromide, ethyl chloride, pentadecyl chloride, eicosyl chloride, and the like. The monohaloalkanes employed in the process of my invention can comprise straight chain or branched chain monohaloalkanes or mixtures thereof.

The aromatic hydrocarbons which can be subjected to alkylation with the heretofore described monohaloalkanes include, among others, such hydrocarbons as benzene, toluene, xylene, naphthalene, diphenyl, phenanthrene, anthracene, pyren, phrysene, ethyl benzene, and the like. Preferred aromatic hydrocarbons employed to produce a high molecular weight detergent alkylate are benzene and toluene, with benzene the more preferred aromatic hydrocarbon. Relatively narrow boiling range mixtures of aromatic compounds, such as those recovered from various refining operations, can be utilized as the aromatic hydrocarbons if desired. However, essentially pure aromatic compounds are generally preferred.

Referring now to the drawing, the invention will be more fully explained. It will be understood by those skilled in the art that many pumps, valves, condensers, etc., have been omitted as not being necessary to explain the invention to those skilled in the art and to simplify the said drawing. A halogenated hydrocarbon feed comprising a mixture of primary and secondary monohaloalkanes is introduced via conduit means 11 into alkylation zone 12, wherein it is desired to produce a detergent alkylate. The halogenated hydrocarbon feed will comprise a mixture of straight chain primary and secondary monohaloalkanes and n-paraffinic hydrocarbons. An aromatic hydrocarbon feed is introduced via conduit means 10 into alkylation zone 12. A suitable alkylation catalyst which will selectively alkylate aromatic hydrocarbons with secondary monohaloalkanes is introduced into alkylation zone 12 via conduit means 17. An example of a suitable catalyst is hydrogen fluoride, preferably anhydrous or essentially anhydrous hydrogen fluoride. However, said hydrogen fluoride can contain up to about 5 percent water by volume. Although not to be limited thereto, the invention will hereinafter be described using hydrogen fluoride as the alkylation catalyst.

The conditions employed in alkylation zone 12 will depend somewhat upon the catalyst employed, the aromatic hydrocarbon to be alkylated, and the mixture of primary and secondary monohaloalkanes. As will be understood by those skilled in the art, said conditions are somewhat inter-related. When employing the above-described hydrogen fluoride catalyst, the alkylation will be conducted in the liquid phase and will generally be conducted at a temperature within the range of 30–260° F., preferably from about 175 to about 210° F. The pressure in said alkylation zone is not critical, will usually be autogenous, and will generally be less than 500 p.s.i. When operating in a continuous system, flow rates of reactants including a recycle olefin feed hereinafter described, should be maintained such that the residence or contact time in the alkylation zone is within the range of from about 10 minutes to about 90 minutes, preferably from about 30 to about 60 minutes.

A 1-olefin feed from a source hereinafter described is introduced into alkylation zone 12 via conduit means 37. In the production of a detergent alkylate, the 1-olefin feed will comprise a linear 1-olefin feed. The mol ratio of the 1-olefin feed introduced into alkylation zone 12 via conduit means 37 to the aromatic hydrocarbon feed introduced into the alkylation zone 12 via conduit means 10 is in the range of 1:25 to 1:15, preferably in the range of 1:15 to 1:10. In addition to the aromatic hydrocarbon required to react with the 1-olefin feed, additional aromatic hydrocarbon is introduced into alkylation zone 12 sufficient so as to furnish at least one gram mol of benzene per gram atom of halogen on the secondary haloalkanes. The mol ratio of this aromatic hydrocarbon to the secondary monohaloalkanes contained in the halogenated feed to alkylation zone 12 can vary over a wide range but will generally be within the range of from about 1.5:1 to 25:1, preferably from about 1.5:1 to 10:1.

The ratio of the total reactants passed to alkylation zone 12, i.e., the sum of the aromatic hydrocarbon, the mixture of monohaloalkanes and the 1-olefin feed, to the hydrogen fluoride catalyst will usually be within the range of from about 0.5:1 to 5:1, on a volume basis.

An alkylation zone effluent comprising alkylate, unreacted aromatic hydrocarbon, unreacted primary monohaloalkanes, n-paraffinic hydrocarbons, a hydrogen halide and catalyst, is passed from alkylation zone 12 via conduit means 13 to a separation vessel 14. When hydrogen fluoride is employed as the alkylation catalyst, the alkylation zone effluent is separated into a hydrocarbon phase and an acid phase within separation vessel 14. A hydrocarbon phase is withdrawn from the upper region of separation vessel 14 via conduit means 16 and passed to a stripper column 18. An acid catalyst phase is withdrawn from separation vessel 14 via conduit means 17 and recycled to alkylation zone 12. As illustrated, a portion of the acid catalyst can be withdrawn from the process via conduit means 15 and passed to an acid rerun system wherein acid soluble oils and water are separated from the acid catalyst. Additional catalyst as required is introduced into alkylation zone 12 via conduit means 38 and conduit means 17.

Within stripper 18, a hydrogen halide (chloride or bromide) is separated from the feed to stripper 18 and withdrawn from stripper 18 as a vapor via conduit means 19. A liquid stream comprising alkylate, unreacted aromatic hydrocarbon, unreacted primary monohaloalkanes, n-paraffinic hydrocarbons (when present in halogenated hydrocarbon feed to alkylation zone) and a minor concentration of hydrogen fluoride catalyst is passed from stripper 18 via conduit means 20 to a stripper 21. A top temperature in the range of 190 to 210° F. and a top pressure in the range of 175 to 225 p.s.i.g. is normally maintained in the top of stripper 18.

Within stripper 21, the hydrogen fluoride catalyst contained in the feed to stripper 21 is separated from the feed and withdrawn as a vapor from stripper 21 via conduit means 22. The withdrawn hydrogen fluoride is recycled, as illustrated, to separation vessel 14. A liquid stream comprising alkylate, unreacted aromatic hydrocarbon, unreacted primary monohaloalkanes, and n-paraffinic hydrocarbons is passed from stripper 21 via conduit means 23 to a distillation column 24. A top temperature in the range of 115 to 135° F. and a top pressure of 22 to 32 p.s.i.g. is normally maintained in stripper 21.

Within distillation column 24, the unreacted aromatic hydrocarbon fraction is separated from the feed to distillation column 24 and withdrawn from distillation column 24 via conduit means 26 as a vapor and recycled to alkylation zone 12 via conduit means 10. A liquid stream comprising alkylate, unreacted primary monohaloalkanes and n-paraffinic hydrocarbons is passed from distillation column 24 via conduit means 27 to distillation column 28. A top temperature in the range of 170 to 190° F. and and a top pressure in the range of 0 to 2 p.s.i.g. is normally maintained within distillation column 24.

Within distillation column 28, the n-paraffinic hydrocarbons are separated from the feed and withdrawn as a vapor from the top of distillation column 28 via conduit means 29. A liquid stream comprising unreacted primary monohaloalkanes and alkylate is passed from distillation column 28 via conduit means 30 to distillation column 31. A top temperature in the range of 345 to 365° F. and a top pressure in the range of 360 to 440 mm. Hg absolute is normally maintained within distillation column 28.

Within distillation column 31, the feed is separated into a product light alkylate fraction withdrawn from an intermediate region of distillation column 31 via conduit means 33, a heavy alkylate fraction withdrawn from distillation column 31 via conduit means 32, and a primary monohaloalkane fraction withdrawn from the top of distillation column 31 via conduit means 34. A top temperature in the range of 265 to 285° F., a top pressure in the range of 18 to 22 mm. Hg absolute, a bottom temperature in the range of 450 to 500° F. and a bottom pressure in the range of 27 to 33 mm. Hg absolute is normally maintained within distillation column 31.

The vaporous primary monohaloalkane fraction withdrawn from distillation column 31 via conduit means 34 is passed to a dehydrohalogenation zone 36 wherein the primary monohaloalkanes are dehydrohalogenated to produce 1-olefins. Dehydrohalogenation zone 36 can contain a dehydrohalogenation catalyst such as the oxidative activated charcoal catalyst disclosed in U.S. 3,240,834, Ser. No. 207,080, filed July 2, 1962, by C. W. Kruse and G. C. Ray. As disclosed therein, a dehydrohalogenation catalyst is prepared from the conventionally activated carbon, which can be made particularly active by an oxidizing treatment in air at elevated temperatures.

Employing the above oxidative activated charcoal dehydrohalogenation catalyst, the temperature of the dehydrohalogenation zone is normally maintained in the range between 527 and 707° C. As required, the oxidative activated charcoal catalyst within dehydrohalogenation zone 36 can be regenerated with steam at a temperature, for example, of 750° F.

An effluent stream comprising hydrogen halide and 1-olefins is withdrawn from dehydrohalogenation zone 36 via conduit means 37 and recycled to alkylation zone 12.

The invention is further illustrated by reference to the following specific example. Referring again to the drawing, benzene having an API gravity of 28.5 is passed via conduit means 10 to alkylation zone 12 at the rate of 187.0 pounds per hour. A halogenated feed comprising 25 pounds per hour of primary and secondary chlorinated $C_{11}$ and $C_{12}$ alkanes and 75 pounds per hour of n-paraffinic hydrocarbons consisting of 50 weight percent n-undecane and 50 weight percent n-dodecane is passed via conduit means 11 to alkylation zone 12. A recycle stream comprising 2.03 pounds per hour of $C_{11}$ and $C_{12}$ linear 1-olefins and 0.46 pound per hour of hydrogen chloride is passed via conduit means 37 to alkylation zone 12. Hydrogen fluoride is recycled to alkylation zone 12 via conduit means 17 at the rate of 143.5 pounds per hour. Benzene is recycled to alkylation zone 12 via conduit means 26 and conduit means 10 at the rate of 179 pounds per hour. Recycle hydrogen fluoride is withdrawn from conduit means 17 via conduit means 15 at the rate of 12.5 pounds per hour and makeup hydrogen fluoride is added to the recycle hydrogen fluoride stream at the rate of 12.5 pounds per hour.

A temperature of 194° F. is maintained within alkylation zone 12. Reactants are introduced into alkylation zone 12 and effluent withdrawn from alkylation zone 12 so as to maintain an average residence time of 0.75 hour within alkylation zone 12. The secondary chloroalkanes are converted within alkylation zone 12 and an effluent comprising primary chloroalkanes, alkylate, $C_{11}$ and $C_{12}$ n-paraffins, hydrogen chloride, benzene and hydrogen fluoride is passed via conduit means 13 to separation vessel 14.

As heretofore described, within separation vessel 14 the effluent is separated into a hydrocarbon phase and an acid phase.

Catalyst phase is withdrawn from separation vessel 14 via conduit means 17 and recycled to alkylation zone 12 in the heretofore described manner. Hydrocarbon phase is withdrawn from separation vessel 14 via conduit means 16 and passed to stripper 18 via conduit means 16.

Stripper 18 is operated at a top temperature of 200° F. and a top pressure of 200 p.s.i.g. Vaporous hydrogen chloride is withdrawn from the top of stripper 18 at the rate of 5.19 pounds per hour. A liquid stream comprising alkylate, unreacted benzene, hydrogen fluoride, and $C_{11}$ to $C_{12}$ n-paraffinic hydrocarbons is passed from stripper 18 via conduit means 20 to stripper 21.

Stripper 21 is evaporated at a top temperature of 125° F. and a top pressure of 27 p.s.i.g. Within stripper 21, hydrogen fluoride is separated from the feed and withdrawn as a vapor from the top of stripper 21 at the rate of 7.18 pounds per hour. A liquid stream comprising unreacted benzene, alkylate, $C_{11}$ and $C_{12}$ n-paraffinic hydrocarbons is withdrawn from stripper 21 and passed via conduit means 23 to distillation column 24.

Distillation column 24 is operated at a top temperature of 177° F. and a top pressure of 1 p.s.i.g. Unreacted benzene is separated from the feed to distillation column 24 and withdrawn from distillation column 24 via conduit means 26 at the rate of 179 pounds per hour. A liquid stream comprising $C_{11}$ and $C_{12}$ n-paraffinic hydrocarbons, chloroalkane, alkylate is passed from distillation column 24 via conduit means 27 to distillation column 28.

Distillation column 28 is operated at a top temperature of 355° F. and a top pressure of 400 millimeters of mercury absolute. The fraction comprising $C_{11}$ and $C_{12}$ n-paraffinic hydrocarbons is withdrawn from distillation column 28 via conduit means 29 at the rate of 75 pounds per hour. A liquid stream comprising primary chloroalkanes and alkylate is passed from distillation column 28 to distillation column 31 via conduit means 30.

Distillation column 31 is operated at a top temperature of 275° F., a top pressure of 20 millimeters of mercury absolute, a bottom temperature of 450° F. and a bottom pressure of 30 millimeters of mercury absolute. The temperature and pressure at the point of communication of conduit 33 at distillation column 31 is 365° F. and 25 millimeters of mercury absolute, respectively. A light alkylate fraction having a distillation range from 547 to 613° F. is withdrawn from distillation column 31 via conduit means 33 at the rate of 25 pounds per hour. A heavy alkylate fraction boiling above 613° F. is withdrawn from distillation column 31 via conduit means 32 at 1.87 pounds per hour. A primary chloroalkane fraction having a distillation range of 467 to 501° F. is withdrawn from distillation column 31 and passed via conduit means 34 to dehydrohalogenation zone 36 at the rate of 2.5 pounds per hour.

Within dehydrohalogenation zone 36, the primary chloroalkanes are passed as a vapor through a fixed catalyst bed of oxidized activated charcoal maintained at a temperature of 572° F. The liquid hourly space velocity within the fixed catalyst bed is maintained at 0.6.

A product linear 1-olefin fraction comprising $C_{11}$ and $C_{12}$ olefins and containing hydrogen chloride is withdrawn from dehydrohalogenation zone 36 and passed via conduit means 37 to alkylation zone 12 in the previously described manner.

As will be evident to those skilled in the art, various modifications of this invention can be made, or followed, in the light of the foregoing disclosure, without departing from the spirit or scope thereof.

I claim:

1. A process for producing a detergent grade alkylate which comprises passing a mixture of primary and secondary monohaloalkanes containing from 10 to 15 carbon atoms per molecule to an alkylation zone, passing an aromatic hydrocarbon to said alkylation zone, maintaining alkylation conditions within said alkylation zone such that said secondary monohaloalkanes react to form an alkylate, and said primary monohaloalkanes pass through without reacting to any appreciable extent, separating unreacted primary monohaloalkanes from an effluent withdrawn from said alkylation zone, passing the separated primary monohaloalkane to a dehydrohalogenation zone, maintaining dehydrohalogenation conditions within said dehydrohalogenation zone, and passing an olefin effluent from said dehydrohalogenation zone to said alkylation zone.

2. The process of claim 1 wherein said mixture of primary and secondary monohaloalkanes comprises a mixture of straight chain primary and secondary monohaloalkanes.

3. A process for producing a detergent grade alkylate which comprises passing a mixture of primary and secondary monohaloalkanes containing from 10 to 15 carbon atoms per molecule to an alkylation zone, passing an aromatic hydrocarbon to said alkylation zone, maintaining alkylation conditions within said alkylation zone such that said secondary monohaloalkanes react to form an alkylate, and said primary monohaloalkanes pass through without reacting to any appreciable extent, passing a hydrocarbon effluent from said alkylation zone to a first separation zone, withdrawing a hydrogen halide from said first separation zone, passing the remainder of said hydrocarbon effluent from said first separation zone to a second separation zone, withdrawing unreacted aromatic hydrocarbon from said second separation zone, passing the remainder of the effluent from said second separation zone to a third separation zone, withdrawing an alkylate product fraction from said third separation zone, passing an unreacted primary monohaloalkane fraction from said third separation zone to a dehydrohalogenation zone, maintaining dehydrohalogenation conditions within said rehydrohalogenation zone, and passing the effluent containing an olefin from said dehydrohalogenation zone to said alkylation zone.

4. A process for producing a detergent grade alkylate which comprises passing a mixture comprising primary and secondary monohaloalkanes selected from the group consisting of monochloroalkanes and monobromoalkanes containing from 10 to 50 carbon atoms per molecule and an n-paraffinic hydrocarbon to an alkylation zone, passing an aromatic hydrocarbon to said alkylation zone, passing hydrogen fluoride to said alkylation zone, maintaining alkylation conditions within said alkylation zone such that said secondary monohalokanes react to form an alkylate, and said primary monohaloalkanes pass through without reacting to any appreciable extent, passing an effluent liquid mixture from said alkylation zone to a separation zone, separating said effluent mixture into an acid phase and a hydrocarbon phase within said separation zone, passing said acid phase from said separation zone to said alkylation zone, passing said hydrocarbon phase from said separation zone to a first stripping zone, withdrawing a vaporous hydrogen halide selected from the group consisting of hydrogen chloride and hydrogen bromide from said first stripping zone, passing the remainder of said hydrocarbon phase from said first stripping zone to a second stripping zone, withdrawing a vaporous hydrogen fluoride from said second stripping zone, passing a hydrogen fluoride-free liquid from said second stripping zone to a first distillation zone, passing an unreacted aromatic hydrocarbon fraction from said first distillation zone to said alkylation zone, passing a liquid mixture from said first distillation zone to a second distillation zone, withdrawing a vaporous hydrocarbon n-paraffinic fraction from said second distillation zone, passing a liquid mixture from said second distillation zone to a third distillation zone, withdrawing a product alkylate fraction from said third distillation zone, passing an unreacted primary monohaloalkane fraction from the upper region of said third distillation zone to a dehydrohalogenation zone, maintaining dehydrohalogenation conditions within said dehydrohalogenation zone, and passing an effluent containing a 1-olefin from said dehydrohalogenation zone to said alkylation zone.

5. The process of claim 4 wherein said product alkylate fraction comprises a light alkylate fraction withdrawn from an intermediate region of said third distillation zone and a heavy alkylate fraction withdrawn from the lower region of said third distillation zone.

6. The process of claim 5 wherein the primary monohaloalkane passed from said third distillation zone to said dehydrohalogenation zone is in the vapor phase and wherein the dehydrohalogenation reaction within said dehydrohalogenation zone is conducted in the vapor phase.

References Cited

UNITED STATES PATENTS

| 1,995,827 | 3/1935 | Thomas | 260—671 |
| 2,740,807 | 4/1956 | Rappen et al. | 260—671 X |
| 2,761,000 | 8/1956 | Hervert et al. | 260—671 |
| 3,277,204 | 4/1966 | Ferstandig et al. | |

OTHER REFERENCES

Schwartz et al., Surface Active Agents, vol. I, Interscience Publishers, Inc., New York (1949), pp. 112 and 113.

DELBERT E. GANTZ, *Primary Examiner.*

C. R. DAVIS, *Assistant Examiner.*